United States Patent [19]

Fortuin et al.

[11] Patent Number: 5,601,769
[45] Date of Patent: Feb. 11, 1997

[54] PROCESS FOR MAKING A COMPOSITE MEMBRANE WITH HIGH SELECTIVITY AND FLUX

[75] Inventors: Henricus M. Fortuin, Maastricht; Petrus H. M. Stokman, Geleen, both of Netherlands

[73] Assignee: DSM N.V., Netherlands

[21] Appl. No.: 471,325

[22] Filed: Jun. 2, 1995

Related U.S. Application Data

[62] Division of Ser. No. 160,167, Dec. 2, 1993, abandoned.

[30] Foreign Application Priority Data

Dec. 3, 1992 [BE] Belgium ............................ 9201062

[51] Int. Cl.$^6$ ............................................ B29C 67/20
[52] U.S. Cl. .................. 264/135; 264/154; 264/171.13; 264/288.8; 427/172; 427/421; 427/429; 427/434.2
[58] Field of Search .................... 264/41, 46.1, 46.4, 264/135, 154, 171.13, 288.8; 427/172, 243, 421, 429, 434.2

[56] References Cited

U.S. PATENT DOCUMENTS

| | | | |
|---|---|---|---|
| 3,369,343 | 2/1968 | Robb | 95/46 |
| 4,602,922 | 7/1986 | Cabasso et al. | 96/13 |
| 4,919,856 | 4/1990 | Anazawa et al. | 264/135 X |
| 4,931,181 | 7/1990 | Blume et al. | 210/500.27 |
| 5,085,776 | 2/1992 | Blume et al. | 210/500.27 |
| 5,160,353 | 2/1992 | Gochanour | 96/10 |

FOREIGN PATENT DOCUMENTS

| | | | |
|---|---|---|---|
| 174918 | 3/1986 | European Pat. Off. . | |
| 181772 | 5/1986 | European Pat. Off. . | |
| 0333284 | 9/1989 | European Pat. Off. | 96/12 |
| 0398508 | 11/1990 | European Pat. Off. . | |

OTHER PUBLICATIONS

Patent Abstracts of Japan, vol. 15, No. 252 (C–844) May 1991 re JP-A-30 080 925.
Patent Abstracts of Japan, vol. 9, No. 301 (C–316) (2024) Jul. 1985 re JP-A-60 139 815.

*Primary Examiner*—Leo B. Tentoni
*Attorney, Agent, or Firm*—Cushman Darby & Cushman IP Group of Pillsbury Madison & Sutro, LLP

[57] ABSTRACT

A composite membrane including a microporous polymer film having a high air permeability as a support and a non-porous gas or vapor separating coating having a thickness of not more than 15 μm is provided. The separation factor and flux of the membrane are substantially equal to those of the coating. Also provided is a process for the manufacture of a composite membrane including a support and a gas or vapor separating coating by drawing a polymeric film to which the coating material has been applied, and increasing the viscosity of the coating during drawing.

17 Claims, No Drawings

PROCESS FOR MAKING A COMPOSITE MEMBRANE WITH HIGH SELECTIVITY AND FLUX

This is a divisional of application Ser. No. 08/160,167, filed Dec. 2, 1993, which was abandoned on Feb. 16, 1996.

BACKGROUND OF THE INVENTION

1. Field of the Invention

The invention relates to a composite membrane comprising a microporous polymer film as a support and a non-porous gas or vapor-separating coating present on that film.

2. Description of the Related Art

A composite membrane is disclosed in EP-A-181,772. That patent application discloses a method for depositing a layer consisting of a solution of polysiloxane in a suitable solvent onto a porous polysulfone film as a support. The solvent is subsequently removed and the polysiloxane is crosslinked to form a solid coating.

This coating is non-porous, which means that essentially no through-holes are present and no void channels extend from one surface of the coating to the opposite surface, and the composite membrane obtained is suitable as a gas separation membrane.

However, that process of the aforementioned application is suited only for depositing non-porous layers onto supports whose surface pores are small, preferably smaller than 0.1 µm. That is why in these conventional membranes the support exhibits a high resistance to the transfer of gas or vapor. The pores in the surface cannot be chosen any larger, however, inasmuch as the deposited solution would enter the pores and the polysiloxane would partially fill the pores. This would cause the effective thickness, as defined hereafter, of the gas separating coating to increase and the attainable gas flux, as defined hereafter, to decrease.

From EP-A-174,918 it is known to solve the aforementioned problem (of supports with large pores requiring the application of thick coatings) by applying on a porous support first a non-porous intermediate layer with good permeability to gases. A thin, selective coating is subsequently applied to this dense intermediate layer. Although the presence of a suitably chosen intermediate layer need not necessarily reduce the separation factor, as defined hereafter, of the composite membrane to any appreciable extent, it does have a negative effect on the gas permeability and the attainable gas flux of the membrane.

SUMMARY OF THE INVENTION

The invention aims to provide a composite membrane in which the negative effect of the support on the permeability and the separation factor of the membrane is appreciably smaller than it is in membranes known in the art.

The composite membrane according to the invention is characterized in that the support exhibits an air permeability, measured by the Gurley method, of not more than 40 sec/50 ml and that the coating thickness is not more than 15 µm and that the actual separation factor of the membrane is at least 80% of the ideal separation factor of the coating and the effective thickness of the coating is not more than 20% greater than the nominal thickness, as defined hereafter, of that layer. The air permeability is preferably not more than 20 s/50 ml, more preferably not more than 10 s/50 ml and most preferably not more than 5 s/50 ml. The definition of the separation factors will be given later.

The membranes of the invention allow gas or vapor separation with a high actual separation factor and a high flux, which is understood to be the amount of gas or vapor that can pass through the membrane per unit time and per unit area at a given pressure difference across the membrane.

The effect of the resistance of the support manifests itself in a decrease in the flux through the membrane. This decrease can be expressed as an equivalent increase in the thickness of the coating, i.e., the increase that brings about a corresponding flux decrease, so that the composite membrane may be characterised by an effective thickness of the coating. This effective thickness can be calculated by dividing the flux of the membrane by the flux per unit thickness of the material of the coating. In the case of the membrane of the invention this effective thickness is not more than 20% greater than the nominal thickness of the coating, preferably not more than 15%, more preferably not more than 10% and preferably not more than 5%. The nominal thickness of the coating is understood to be the average thickness of the coating in the membrane, measured by means of Scanning Electron Microscopy (SEM).

The relatively high resistance to gas and vapor transport of the support in the composite membranes known in the art restricts the flux of the membrane as a whole to a value which is substantially lower than that of the coating. Thinner coatings by their nature exhibit a lower transport resistance than thicker ones so that the relative effect of the resistance of the support becomes more predominant with decreasing thickness of the coating. Consequently, the advantages of the membrane according to the invention manifest themselves especially in thin coatings, particularly in coatings of not more than 15 µm, more particularly in coatings of not more than 10 µm and even in coatings of not more than 5 and even of 2 µm.

Furthermore, it has been found that a high resistance to gas and vapor transport usually also has a negative effect on the separation factor when a gas or vapor mixture is separated into its individual components. Surprisingly, the actual separation factor of the membrane fabricated according to the invention is virtually equal to the ideal separation factor of the coating proper, which is defined hereafter more specifically, according to the present invention, the actual separation factor can reach. at least 80% and more preferably at least 90% and even 95% of the ideal separation factor.

The supporting film used in the composite membrane according to the invention should consist of a continuous material fabricated by, for instance, extrusion or casting onto a band or roll from a melt or solution of the polymer, or by compressing the polymer material in a fluid state into a continuous structure at elevated pressure and temperature. Outside the scope of the invention are discrete fibers or threads made up of long polymeric objects such as those obtained by weaving, knitting or other known, analogous techniques such as those by which non-woven structures are fabricated.

The invention also relates to a process for fabricating a composite membrane comprising a non-porous layer on a microporous polymeric support. This process comprises drawing a polymeric film which on drawing becomes more porous, to which film an initial film is applied containing the material of the non-porous coating or a precursor thereof.

Such a process is known from U. S. Pat. No. 4.919.856, in which a solution of, for instance, polysiloxane is applied to a non-porous hollow polyethylene fiber. The solvent is evaporated, whereupon the fiber, being covered with polysiloxane in non-liquid, for example solid or semisolid, state, is drawn. In this process, the support becomes microporous whilst the coating remains non-porous. Finally, the polysiloxane is thermally crosslinked.

A disadvantage to this known process is that only draw ratios of up to about 2 can be applied because otherwise pores and holes develop in the polysiloxane layer. No higher draw ratios are possible in the known process because if the initial layer is present in the solid state, it can withstand only slight drawing without tearing and if this layer is present in the liquid state, drawing must be limited so as to prevent the pores from becoming too large, thereby causing the material of the layer to sink into the pores. At said low draw ratios the support material becomes only slightly porous and only small pores of maximum of 0.5 μm are formed. As a consequence, the support offers considerable resistance to gas and vapor transport and when the composite membrane is applied, for instance, for gas or vapor separation, the porous support restricts the discharge of the gas or vapor selectively diffusing through the non-porous layer.

The invention aims to provide a process allowing composite membranes to be fabricated, in which the support offers less resistance to gas and vapor transport the membranes known in the art.

This objective is achieved by the invention in that when drawing is commenced the initial layer is present in the liquid state and in that the viscosity of the initial layer is increased during drawing.

DESCRIPTION OF THE PREFERRED EMBODIMENTS

A support is selected which at commencement of the process is either is not yet porous or whose surface pores still are so small that the initial layer deposited on the surface cannot sink into them. This method has been found to allow higher draw ratios so that supports with a higher porosity and a greater mean flow pore size can be obtained and both the coating and the support may be substantially thinner than in the method known in the art, thereby favorably affecting the flux. Drawing increases the porosity and particularly the permeability to gases of the support. At the same time, however, the viscosity of the initial layer must be increased, while insuring that the increasingly viscous initial layer can span the greatest pore size of the support without collapsing under its own weight, so that the initial layer is prevented from sinking into the pores at all-times. In this way, a composite membrane can ultimately be obtained in which the mean flow pore size of the support can be substantially more than 0.5 μm and which is provided with a very thin coating. The method according to the invention has even been found capable of producing composite membranes in which the mean flow pore size of the support is 1 μm or more and even 2 μm or more. Consequently, the overall resistance to gas or vapor transport of such a membrane is substantially less than that of a membrane produced according to the state of the art.

As polymeric film which can be drawn to serve as the desired microporous support use may in principle be made of any film whose surface pores are so small that the initial layer cannot sink into them or can sink into them only to a very limited extent or which is even non-porous but whose volume porosity and particularly the size of the surface pores increases on drawing. Suitable starting films are for instance films of polytetrafluoroethylene, high and low-density polyethylene, polypropylene, polyetherimide, poly-vinylidene fluoride, polyoxymethylene, polyphenylene sulphide, poly-4-methyl pentene and other polymers from which films can be formed whose porosity increases on drawing under suitable conditions. The presence of inorganic fillers in the polymer often has a favorable effect on the increase in porosity on drawing.

The undrawn films may be produced from a melt or a solution of the polymer by processes known per se in this branch of engineering for the production of such films. Films produced from a solution generally exhibit high drawability and this is of advantage in the process according to the invention. Particularly suitable are films obtained through gelation of a polyethylene solution, preferably polyethylene with an Intrinsic Viscosity, measured in Decalin at 135° C., of at least 4 dl/g, in an organic solvent, for instance Decalin or xylene, followed by removal of the solvent. Such films combine a relatively low initial volume porosity and an initially small surface pore size with high drawability and can be drawn to form supports having excellent mechanical properties, high volume porosity, a large mean flow pore size, relatively large surface pores and high surface porosity. Examples of these are to be found in EP-A-378,279, EP-A-500,173 and EP-A-504,954.

Another advantage of membranes in which such films obtained through gelation are applied is the high pressure resistance of the coating, even in the case of very thin coatings and a large pore diameter. Consequently, the problem known from EP-A-174,918 of the coating cracking at the pores arises at much higher pressure differences across the membrane than in the case of the membranes known in the art. The cause of this is not known but a possible explanation may be sought in the fibrillic structure of the drawn film, as a result of which the pores that are perpendicular to the surface are only shallow.

If the undrawn film has surface pores, they are preferably smaller than 0.2 μm. The film thickness is chosen depending on the desired and attainable draw ratio and the desired thickness of the composite membrane and may be between, for instance, 100 and 1000 μm.

An initial layer is applied to the film, which layer contains the material of the non-porous layer or a precursor thereof. The advantages of the process manifest themselves especially when initial layers having a low viscosity are applied, such as liquid layers which in the processes known in the art would readily sink into the pores of a porous film. The initial layer may be applied by casting, spread coating, spraying or any other suitable technique of applying a layer of the desired uniform thickness onto the polymeric film. The coating usually consists of a polymer, in particular a silicone rubber or other rubber displaying appreciably higher permeability to at least one gas or vapor than to other gases and vapors. Many such polymers are liquid but become solid through crosslinking. Such polymers may suitably be applied in pure form to serve as a liquid initial layer. If a liquid precursor, in the form of a monomer, precursor monomer or oligomer of the material of the first coating is available, which can be made solid, such a precursor may be applied as the initial layer. A solution of the coating material or of a precursor may also be applied as the initial layer. This is preferable for obtaining very thin coatings. An extensive list of materials which because of their selective permeability to various gases or vapors may be applied as the coating in a composite membrane for gas separation which also includes pervaporation and which are deemed to be a part of this description, can be found in U. S. Pat. No. 4,919,856. A condition for applicability is that the material, when dissolved or in the molten state, can be drawn under those conditions under which the porosity of the support increases on drawing and under which the viscosity of the coating can be increased by taking appropriate measures, as disclosed hereafter.

The thickness with which the initial layer is applied is chosen to match the desired thickness of the non-porous coating and the extent to which the polymeric film and the material of the initial layer can be drawn. The thickness of the polymeric film, too, is chosen to match these. In this context it should be remembered that the porosity of the support increases on drawing, which means that its thickness decreases less than proportionally. A certain minimum draw ratio is generally needed for obtaining a microporous film having the desired porosity properties and gas or vapor permeability. On the basis of the desired properties of the composite membrane and the specifications of the starting materials, one skilled in the art will be able choose the correct thicknesses and the draw ratio so that they match one another. A lower limit on the support thickness is dictated by the required mechanical strength of the membrane. Preferably, the support in the membrane is at least 10 µm and more preferably at least 20 µm thick. Although the thickness of the support is not bound by any physical constraints, the thickness is preferably not greater than 100 µm, more preferably not greater than 50 µm and most preferably not greater than 30 µm if a high permeability and flux are to be obtained. The process according to the invention has been found to be capable of producing composite membranes with such thin supports. The invention therefore also relates to composite membranes in which the thickness of the support is not more than 100 µm, preferably not more than 50 µm and most preferably not more than 30 µm. The film with the initial layer applied to it is drawn. Drawing may be effected uniaxially, (i.e. in one direction in the plane of the film), but is preferably effected biaxially, (i.e. in two directions that are at a right angle to each other in the plane of the film). If drawing is uniaxial, the film dimension that is perpendicular to the direction of drawing is preferably kept constant to ensure that in that case, too, drawing leads to a maximum decrease in thickness of the film and of the initial layer. On the other hand, the porosity increase during drawing can be somewhat lessened by allowing a minor decrease in the film dimension that is perpendicular to the direction of drawing. If drawing is biaxial, the drawing in the two directions may be conducted simultaneously or sequentially. In the latter case the initial layer can be applied before the first drawing step or after the first but before the second drawing step. The drawing conditions, such as the temperature and the draw ratio, should be so chosen such that both the film and the initial layer can withstand the conditions without breaking. The optimum drawing conditions and the corresponding maximum draw ratio are either known per se for virtually all polymers, for instance from the aforementioned references concerning the manufacture of films that may be drawn to form a suitable, porous support, or may be established through routine experiments. It is known for high molecular weight polyethylene, for instance, that a film produced from a melt can be drawn about 30–40 times uniaxially or biaxially 6×6 times at a temperature below the melting point whilst a film produced from a solution of the same polymer can be drawn no less than 15×15 times under the same conditions. The materials of the initial layer and of the support are preferably chosen so that the support can be drawn to the desired ratio at a temperature above the glass transition temperature of the material of the coating. If this condition cannot be fulfilled, or if it can be fulfilled only with difficulty, the initial layer is preferably applied in the form of a solution.

The volume porosity of the support as defined hereafter and which substantially determines the gas and vapor permeability, is preferably at least 70%, more preferably at least 80%, and the mean flow pore size (MFP) measured by a Coulter porometer is preferably greater than 0.5 µm and more preferably at least 1.0 µm. In any case, the porosity and the mean flow pore size should be such that the air permeability of the film that has been drawn to form a microporous support, measured by the Gurley method, hereafter referred to as the Gurley value, is not more than 40 s/50 ml, preferably not more than 20 s/50 ml, more preferably not more than 10 s/50 ml, and most preferably 5 s/50 ml.

The non-porous layer is formed from the initial layer during and by drawing. The thickness of the initial layer decreases to the desired thickness as a result of drawing. The viscosity of the initial layer is increased during drawing, as described hereafter. This prevents the initial layer from sinking into the surface pores, which become larger as a result of drawing. The increase in viscosity should impart sufficient strength to the initial layer in order for it to be able to span the expanding pores. A variety of techniques may be applied for increasing the viscosity, depending on the composition of the initial layer. If the initial layer already consists of the material from which the non-porous layer will ultimately also consist and if that material is capable of being cross-linked, the viscosity can be increased by cross-linking, preferably by thermal means, of the initial layer applied in the liquid state. If a precursor of the coating material is applied, the viscosity can often be increased by effecting the conversion of the substances mentioned to the material. If the initial layer consists of a solution of the coating material, the viscosity can be increased by removing the solvent. The solvent used is preferably not a solvent to the polymer of the support. The above mentioned measures mentioned for increasing the viscosity of the initial layer may optionally be taken in combination. The initial layer may in all cases contain suitable additives such as accelerators, activators, catalysts and the like. The drawing rate and the rate at which the viscosity is increased in the aforementioned or in other suitable manners must always be so matched as to prevent the initial layer from sinking into the pores and to ensure it retains sufficient drawability. By adjusting the drawing rate, for instance, the residence time in the drawing oven, which usually operates at elevated temperature, can be suitably chosen. In this way, both evaporation of the solvent and thermal cross-linking can be effected. The film may also be irradiated during drawing so as to effect cross-linking.

It is only required that during the drawing process the viscosity of the initial layer is increased to such an extent that sinking into the pores is prevented. If required, e.g., the cross-linking process or the solvent removal treatment can be finished after the drawing step.

The process is particularly suitable for producing membranes to be applied for gas separation and pervaporation. In that case, the non-porous layer will consist of a material possessing a better permeability to at least one gas or vapor than to other gases or vapors. In that application, polysiloxanes are highly suitable materials for the non-porous layer.

The invention will be elucidated with reference to the following examples. The quantities mentioned in the examples are determined as follows.

The ideal separation factor $\alpha_0$ of the coating material for separation of two gases is calculated as the ratio of the permeability coefficients of the material for the gases concerned. The permeability coefficient is determined in a cell consisting of two parts separated by the membrane to be tested. The effective membrane area is 11.34 cm². The cell is evacuated and subsequently, to the part of the cell at one side of the membrane, denoted by the feed side, gas is offered at constant pressure. Under the driving force of the vacuum on the other side, denoted as the permeation side, and the pressure at the feed side, sorption and diffusion of the gas in the membrane occurs, which causes the pressure at the permeate side increases. The increase of the pressure at the permeate side, denoted by dp/dt, is recorded. The recorded curve shows an initial curved part, the diffusion region, which shades off in a straight line. The slope of this straight part gives the value of dp/dt to be used for the calculation of the permeability coefficient P according to the following formula:

$$P=\{(273/T\times 1.013\times 10-3)\times V_p\times dp/dt\times 1\}/(A\times p),$$

wherein

P is expressed in $10^{-10}$ cm³.cm/cm².s.cmHg (this unit will be further denoted as "Barrer");

T is the temperature in Kelvin;

$V_p$ is the volume of the cell part at the permeate side in cm³;

dp/dt is the increase of pressure at the permeate side in mbar/s;

l is the thickness of the separating layer of the membrane;

A is the effective membrane area; and p is the pressure over the membrane.

In case a mixture of gases a and b is used the permeability coefficients of both gases can be determined by applying the partial pressures over the membrane in the given formula. The composition of the gas at the permeate side is determined by gas chromatography.

The actual separation factor, α, of a composite membrane for gas separation is calculated in an analogous manner from the permeability coefficients of the membrane for the gases concerned.

The separation properties of the coating material in pervaporation are determined from measurements on a CELFA P28 Laboranlage® pervaporation set-up. A 10-% solution of ethanol in water at a temperature of 55° C. and a pressure of 2 bar is present on the feed side. The pressure on the permeate side is 20 mbar.

The ideal separation factor of the coating material for the separation of two components 1 and 2 from a mixture of liquids in pervaporation is then calculated as follows:

$$\alpha_o=(X1/X2)/(Y1/Y2)$$

where X1 and X2 represent the percentage concentrations of the components 1 and 2 on the permeate side and Y1 and Y2 represent the concentrations on the feed side of the membrane.

The actual separation factor, α, of a composite membrane in pervaporation is calculated in the same way from the concentrations mentioned, measured in the set-up referred to with the composite membrane as the separating element.

The air permeability is determined in s/50 ml as the Gurley value in accordance with ASTM Standard D726-58 with a measuring area of 6.45 cm₂ (1 sq. inch) under a weight of 567 grams.

The thickness of the support is measured either with a Millitron Feinpruf meter, the probe of which has a radius of curvature of 12 mm, or by Scanning Electron Microscopy (SEM). The coating thickness is also determined by SEM.

The density of the support is determined by weighing a piece of film of known volume. The volume porosity is determined from the measured density ρ and the density of the polyolefinic bulk material $\rho_0$ as:

$$\text{volume porosity} = \frac{\rho_0 - \rho}{\rho_0} \times 100\%.$$

The pore size distribution and, based on this, the mean flow pore (MFP) size are determined with the aid of a Coulter porometer.

The intrinsic viscosity (IV) of polyethylene is determined in Decalin at 135° C.

EXAMPLE I

A polyethylene film having an IV of 16 dl/g, a thickness of 450 μm, a volume porosity of 30% and a Gurley value of 133 s/50 ml is spread coated with a mixture of 12 parts by weight of polydimethylsiloxane (PDMS; RTV 615A of GE Silicones), a liquid silicone rubber, to which a cross-linking agent (RTV 615 B of GE Silicones) has been added. The viscosity of this initial layer is about 4 Pa.s, the thickness of the layer is 130 μm. A square section of 8×8 cm is cut from this and is simultaneously biaxially drawn in an Iwamoto drawing frame at a rate of 5 mm/s at 120° C. During drawing, the PDMS is cross-linked almost completely. On cooling to room temperature, the drawn film is removed from the frame. Its thickness, porosity and permeability are determined. The Gurley value of the membrane is infinite, which means that the coating is completely impermeable and free of holes. The properties of the drawn support are measured on the support after removal of the PDMS layer. The properties measured on a support drawn without a coating but otherwise under the same conditions are found not to differ therefrom to any appreciable extent. The results are given in Table 1.

TABLE 1

| Draw ratio Membrane: | 4 × 4 | 5 × 5 | 6 × 6 | 8 × 8 |
| --- | --- | --- | --- | --- |
| Support thickness (μm) | 100 | 70 | 55 | 32 |
| Coating thickness (μm) | 14 | 11 | 6 | 1.5 |
| Gurley value (S/50 ml) | ∞ | ∞ | ∞ | ∞ |
| Support: | | | | |
| Porosity (%) | 87 | 87 | 85 | 84 |
| Gurley value (s/50 ml) | 0.5 | 0.6 | 0.3 | 0.3 |
| Max. pore size (μm) | 7.6 | 7.8 | 9.9 | 10.7 |
| Min. pore size (μm) | 3.7 | 3.3 | 3.7 | 4.2 |
| Mean pore size (μm) | 4.4 | 4.9 | 4.8 | 6.0 |

EXAMPLE II

A polyethylene film having an IV of 4 dl/g, a thickness of 450μm, a volume porosity of 35% and a Gurley value of 1200 s/50 ml is spread coated, with the aid of a doctor blade, with a 400-μ thick layer of a 30-% solution of high molecular weight (400,000 g/mol), atactic polymethyl methacrylate (PMMA) in acetone. A square section of 8×8 cm cut from this film is biaxially drawn in an Iwamoto drawing frame at a rate of 5 mm/s at 120° C. The solvent evaporates during drawing. The properties of the membrane and the support are determined on the analogy of Example 1. The results are given in Table 2.

TABLE 2

| Draw ratio | 4 × 4 | 5 × 5 | 6 × 6 |
|---|---|---|---|
| Membrane: | | | |
| Support thickness (μm) | 128 | 115 | 85 |
| Coating thickness (μm) | 10 | 8 | 4.5 |
| Gurley value (S/50 ml) | ∞ | ∞ | ∞ |
| Support: | | | |
| Porosity (%) | 84 | 83 | 85 |
| Gurley value (s/50 ml) | 15.6 | 11.3 | 8.1 |
| Max. pore size (μm) | 0.87 | 0.71 | 0.91 |
| Min. pore size (μm) | 0.24 | 0.25 | 0.34 |
| Mean pore size (μm) | 0.54 | 0.57 | 0.62 |

EXAMPLE III

A polyethylene film having an IV of 4 dl/g, a thickness of 600 μm, a volume porosity of 30% and an MFP of less than 0.07 μm is spread coated with the polydimethylsiloxane—cross-linking agent mixture of Example I. The viscosity of this initial layer is about 4 Pa.s. A square section of 8×8 cm cut from this film is biaxially drawn 5×5 times in an Iwamoto drawing frame at a rate of 5 mm/s at 120° C. During drawing, the PDMS is cross-linked almost completely. On cooling to room temperature, the drawn film is removed from the drawing frame and tested with respect to its properties as a composite membrane. In the pervaporation test, the ethanol concentration on the permeate side after 6 hours is 45%. The actual separation factor of the membrane for ethanol/water is calculated herefrom to be 7.4. The ideal separation factor, measured on a self-supporting 100-μm thick PDMS layer, is 7.8. The flux of the composite membrane standardized with respect to the coating thickness is 3.0 kg/$m_2$.h.μm. The flux of pure PDMS is 3.2 kg/$m_2$.h.μm. This means that the presence of the support reduces the separation factor by only 5% relative to the ideal separation factor and has no greater effect on the flux than that of an increase in the thickness of the gas separating coating of only 0.6 μm, which is equivalent to 6.7%.

The data of the membrane and of the support are given in Table 3.

TABLE 3

| Draw ratio | 5 × 5 |
|---|---|
| Membrane: | |
| Support thickness (μm) | 90 |
| Coating thickness (μm) | 9 |
| Gurley value (S/50 ml) | ∞ |
| Standardized flux (kg/$m_2$.h.μm) | 3.0 |
| Support: | |
| Porosity (%) | 84 |
| Gurley value (s/50 ml) | 0.7 |
| Max. pore size (μm) | 5.7 |
| Min. pore size (μm) | 2.0 |
| Mean pore size (μm) | 2.7 |

Comparative Example A

The drawn support from Experiment A is spread coated with the PDMS composition used in Example I. The layer thickness corresponding with the setting of the doctor blade was 10 μm. The film clearly turns transparent, which indicates that the PDMS penetrates into the pores of the film. SEM recordings confirmed that the PDMD had penetrated the full depth of the film.

EXAMPLE IV

A polyethylene film having an IV of 4 dl/g, a thickness of 450 μm, a volume porosity of 35% and a Gurley value of 1200 s/50 ml is spread coated, with the aid of a doctor blade, with a 60 μm thick layer of a 21 wt% solution of medium molecular weight (100,000 g/mol), atactic polymethyl methacrylate (PMMA) in acetone. A square section of 8×8 cm cut from this film is sequentially biaxially drawn in an Iwamoto drawing frame at a rate of 5 mm/s at 120° C. The solvent evaporates during drawing. The gas separation properties of the obtained membrane for a 50/50 vol.% mixture of $CO_2$ and $CH_4$ are determined as described above. The results are given in Table 4.

TABLE 4

| Draw ratio | 3 × 3 | 5 × 5 |
|---|---|---|
| Support thickness (μm) | 135 | 100 |
| Coating thickness (μm) | 4.2 | 1.8 |
| Gurley value (S/50 ml) | ∞ | ∞ |
| $CO_2$-permeability (Barrer) | 0.27 | 0.20 |
| $CO_2$-flux (cm$^3$/cm$^2$ · s) | $7 \times 10^{-6}$ | $1.5 \times 10^{-5}$ |
| $\alpha_{CO2/CH4}$ | 30 | 43 |

For comparison it is noted that for pure PMMA the $CO_2$ permeabilty is about 0.34 Barter and the $\alpha_{CO2/CH4}$ about 50.

EXAMPLE V

A roll of polyethylene film having an IV of 4 dl/g, a thickness of 450 μm, a volume porosity of 35%, a Gurley value of 1200 s/50 ml and a width of 24 cm is drawn on a Cellier drawing line first at 125° C. in the direction of its length (Machine Direction, MD) by a drawing factor of 3.8. Subsequently, to the drawn film an initial layer of 60 μm consisting of a mixture of PDMS (RTV615A of GE Silicones) and 10 wt% of the total mixture of a cross linking agent (RTV615B of GE Silicones)is applied using a doctor blade. The coated film was transported with a speed of 13 mm/min through a drawing oven during which it is drawn to 6 × its original width at a temperature increasing from 135 to 140° C. At the exit of the oven the PDMS was completely cross-linked. The gas separation properties of the membrane was determined as described above for a 50:50 vol.% mixture of $CO_2$ and $CH_4$ and for a 20:80 vol.% mixture of $O_2$ and $N_2$. The results are given in Table 5.

TABLE 5

| Membrane: | |
|---|---|
| Support thickness (μm) | 100 |
| Coating thickness (μm) | 10 |
| Gurley value (S/50 ml) | ∞ |
| $CO_2$-permeability (Barrer) | 1734 |
| $\alpha_{CO2/CH4}$ | 2.38 |
| $O_2$-permeability (Barrer) | 340 |
| $\alpha_{O2/N2}$ | 1.64 |
| Support: | |
| Porosity (%) | 85 |
| Gurley value (s/50 ml) | 2.4 |
| Max. pore size (μm) | 2.1 |
| Min. pore size (μm) | 1.0 |
| Mean pore size (μm) | 1.2 |

What is claimed:
1. A process for the manufacture of a composite membrane comprising a non-porous coating on a microporous polymeric support, said process comprising drawing a polymeric film and forming the composite membrane, wherein the polymeric film becomes more porous during said drawing and has an initial layer applied thereto, the initial layer containing the material of the non-porous coating or a precursor thereof, wherein when said drawing is commenced the initial layer is present in a liquid state, and wherein the viscosity of the initial layer is increased during said drawing.

2. A process according to claim 1, wherein when said drawing is commenced the initial layer comprises a solution of the material of the non-porous coating or the precursor thereof in a solvent and wherein the viscosity of the initial layer is increased by removing at least a portion of the solvent during said drawing.

3. A process according to claim 1, wherein the viscosity of the initial layer is increased by cross-linking the material or the precursor of the initial layer during said drawing.

4. A process according to claim 2, wherein the viscosity of the initial layer is increased by cross-linking the material or the precursor of the initial layer during said drawing.

5. A process according to claim 1, wherein the non-porous layer is more permeable to at least one gas than to other gases.

6. A process according to claim 2, wherein the non-porous layer is more permeable to at least one gas than to other gases.

7. A process according to claim 3, wherein the non-porous layer is more permeable to at least one gas than to other gases.

8. A process according to claim 1, wherein said drawing is conducted until the polymeric film exhibits an air permeability, measured by the Gurley method, of not more than 20 sec/50 ml.

9. A process according to claim 2, wherein said drawing is conducted until the polymeric film exhibits an air permeability, measured by the Gurley method, of not more than 20 sec/50 ml.

10. A process according to claim 3, wherein said drawing is conducted until the polymeric film exhibits an air permeability, measured by the Gurley method, of not more than 20 sec/50 ml.

11. A process according to claim 5, wherein said drawing is conducted until the polymeric film exhibits an air permeability, measured by the Gurley method, of not more than 20 sec/50 ml.

12. A process for the manufacture of a composite membrane comprising a non-porous coating on a microporous polymeric support, said process comprising the steps of:

biaxially drawing a polymeric film, said step of biaxially drawing comprising first drawing the polymeric film in a first direction and second drawing the polymeric film in a second direction that differs from the first direction, said second drawing step being conducted subsequent to said first drawing step; and forming the composite membrane, wherein the polymeric film becomes more porous during said step of biaxially drawing and has an initial layer applied thereto, the initial layer containing the material of the non-porous coating or a precursor thereof, wherein the initial layer is both present in a liquid state and applied to the polymeric film before said second drawing step, and wherein the viscosity of the initial layer is increased during said step of biaxially drawing.

13. A process according to claim 12, wherein when the initial layer is applied to the polymeric film the initial layer comprises a solution of the material of the non-porous coating or the precursor thereof in a solvent, and wherein the viscosity of the initial layer is increased by removing at least a portion of the solvent during said step of biaxially drawing.

14. A process according to claim 12, wherein the viscosity of the initial layer is increased by cross-linking the material or the precursor of the initial layer during said step of biaxially drawing.

15. A process according to claim 13, wherein the viscosity of the initial layer is increased by cross-linking the material or the precursor of the initial layer during said step of biaxially drawing.

16. A process according to claim 12, wherein the non-porous layer is more permeable to at least one gas than to other gases.

17. A process according to claim 12, wherein said step of biaxially drawing is conducted until the polymeric film exhibits an air permeability, measured by the Gurley method, of not more than 20 sec/50 ml.

* * * * *